United States Patent [19]
Sasaki et al.

[11] Patent Number: 5,467,606
[45] Date of Patent: Nov. 21, 1995

[54] AIR CONDITIONING APPARATUS CAPABLE OF OPERATING IN COOLING MODE AND HEATING MODE

[75] Inventors: Masahiko Sasaki; Yasutoshi Tsuchiya; Hidetoshi Fukunaga, all of Fuji, Japan

[73] Assignee: Kabushiki Kaisha Toshiba, Kawasaki, Japan

[21] Appl. No.: 142,143

[22] Filed: Oct. 28, 1993

[30] Foreign Application Priority Data

Oct. 28, 1992 [JP] Japan ................................. 4-290043
Oct. 28, 1992 [JP] Japan ................................. 4-290287

[51] Int. Cl.$^6$ ............................. F25B 13/00; F24B 1/06
[52] U.S. Cl. ............................. 62/160; 165/127; 236/38; 454/329
[58] Field of Search ............................. 62/160; 165/127; 454/329; 236/38, 49.3

[56] References Cited

U.S. PATENT DOCUMENTS 5,086,626  2/1992  Iida ........................ 236/38 X

FOREIGN PATENT DOCUMENTS 59-6174    2/1984  Japan .
64-53812   4/1989  Japan .
0176346    7/1990  Japan ........................ 454/329

Primary Examiner—William E. Wayner
Attorney, Agent, or Firm—Cushman Darby & Cushman

[57] ABSTRACT

An air conditioning apparatus comprising an indoor unit. The unit has a first indoor heat exchanger for cooling or heating indoor air and a second indoor heat exchanger for cooling or heating indoor air. A first indoor fan is located near the first indoor heat exchanger, for drawing the indoor air and supplying it through the first indoor heat exchanger to the zone of a room. A second indoor fan is located near the second indoor heat exchanger, for drawing the indoor air and supplying it through the second indoor heat exchanger to the zone of a room. The apparatus further comprises two temperature sensors for detecting the temperatures of the indoor heat exchangers, respectively. The higher or lower of the temperatures detected by the sensors is selected, in accordance with the cooling or heating mode in which the apparatus is operating. In accordance with the temperature selected, the air-supplying rates of the indoor fans are controlled.

13 Claims, 9 Drawing Sheets

| SUPPLY RATE \ FAN | 18a | 18b |
|---|---|---|
| HIGH | H | H |
| INTERMEDIATE | M | M |
| LOW | L | L |
FIG. 6
| SUPPLY RATE \ FAN | 18a | 18b |
|---|---|---|
| HIGH | UH | M+ |
| INTERMEDIATE | M+ | M− |
| LOW | M− | L− |
FIG. 7
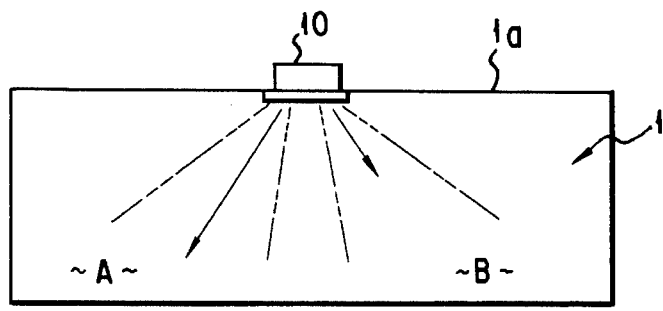
FIG. 8
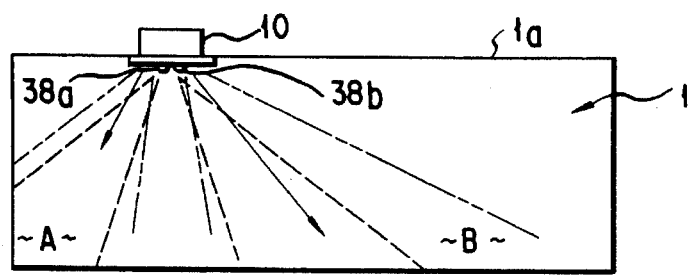
FIG. 9
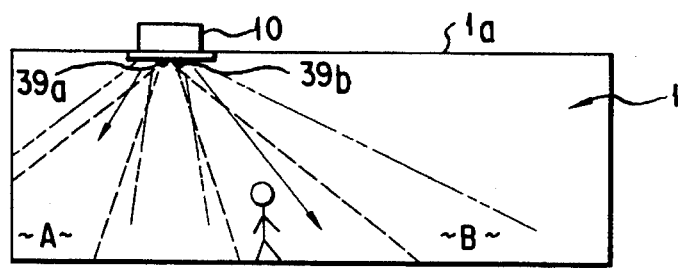
FIG. 11

AIR CONDITIONING APPARATUS CAPABLE OF OPERATING IN COOLING MODE AND HEATING MODE

BACKGROUND OF THE INVENTION

1. Field of the Invention

The present invention relates to an air conditioning apparatus of twin-floor type, which is designed to supply conditioned air in two directions in a room.

2. Description of the Related Art

Their is the trend that rooms are built larger and larger. The larger a room, the less uniform the temperature distribution in the room. An air conditioner has been developed which is designed to supply conditioned air in two directions in a room, to thereby render the temperature distribution uniform in the room. This air conditioner comprises an indoor unit to be secured to the ceiling of a room. The indoor unit has two indoor heat exchangers and two indoor fans. The indoor fans are driven to take indoor air into the respective indoor heat exchangers and to supply the air conditioned thereby in different directions in the room.

Twin-floor type air conditioners are disclosed in, for example, Jpn. UM Appln. KOKOKU Publication No. 59-6174 and Jpn. UM Appln. KOKAI Publication No. 1-53812.

The air conditioner disclosed in Jpn. UM Appln. KOKOKU Publication No. 59-6174 comprises an indoor unit (C) which incorporates two heat exchangers (8, 9), an upper fan (6) and a lower fan (7). The upper fan (6) is used to draw indoor air through an air inlet (2) and supply the indoor air via the first heat exchanger (8) back into the room in a first direction. On the other hand, the lower fan (7) is used to draw the in door air through the air inlet (2) and supply the indoor air via the second heat exchanger (8) back into the room in a second direction. The upper fan (6) and the lower fan (7) can be rotated at various speeds, independently of each other.

The air conditioner disclosed in Jpn. UM Appln. KOKAI Publication No. 1-53812 comprises an indoor unit (1) to be installed on the ceiling of a room. The indoor unit (1) has an air inlets (2) formed in the lower side. The indoor unit (1) incorporates two indoor heat exchangers (3, 4) and two fans (5, 6). The indoor heat exchangers (3, 4) are inclined, and the fans (5, 6) are arranged near the heat exchangers (3, 4), respectively. The indoor unit (1) has two air outlets (7, 8) in the lower side. The air outlets (7, 8) are located at such positions that air may flow through them from the fans (5, 6) into the room.

A twin-floor type air conditioner, as well as any other conventional air conditioner, may supply cold air into the room, making any occupant of the room feel cold, when it starts heating operation. This is because neither indoor heat exchanger has not heated air sufficiently. During the heating operation, the high-pressure side pressure of the refrigerating cycle unit may increases excessively, shortening the lifetime of the components of the refrigerating cycle unit. During the cooling operation, the drain on either indoor heat exchanger may be frozen sometimes.

To prevent these undesirable events, the rate at which the indoor fans supply air into the room may be adjusted. In practice, however, it is very difficult to control both indoor fans to adjust the air supply rate appropriately.

SUMMARY OF THE INVENTION

In view of the forgoing, the object of the present invention is to provide an air conditioning apparatus, wherein two fans are so controlled as to supply air into a room at an appropriate rate, to thereby prevent a supply of cold air into the room, the high-pressure side pressure of a refrigerating cycle unit is prevented from increasing excessively, and the drain on two indoor heat exchangers is prevented from being frozen.

According to this invention, there is provided an air conditioning apparatus capable of operating in cooling mode and heating mode, comprising:

a first indoor heat exchanger for cooling and heating indoor air;

a second indoor heat exchanger for cooling and heating the indoor air;

a first indoor fan for drawing the indoor air and and supplying the indoor air via the first heat exchanger back into the room in a first direction;

a second indoor fan for drawing the indoor air and supplying the indoor air via the second heat exchanger back into the room in a second direction;

a first temperature sensor for detecting the temperature of the first heat exchanger;

a second temperature sensor for detecting the temperature of the second heat exchanger;

selection means for selecting the higher or lower of the temperatures detected by the first and second temperature sensors, in accordance with the mode in which the apparatus is operating; and control means for controlling the first and second indoor fans in accordance with the temperature selected by the selection means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a table showing the conditions at which to drive the fans of each embodiment in ordinary control mode to supply conditioned air at various rates;

FIG. 7 is a table showing the conditions at which to drive the fans of each embodiment in local control mode to supply conditioned air at various rates;

FIG. 8 is a diagram illustrating the directions and amounts in which the indoor unit of each embodiment supply conditioned air into the room, when driven in the local control mode;

FIG. 9 is a diagram showing the positions where radiation temperature sensors are located in the second embodiment;

FIG. 11 is a diagram the positions where occupant sensors are located in the third embodiment.

DETAILED DESCRIPTION OF THE PREFERRED EMBODIMENTS

A first embodiment of this invention, i.e., an air conditioner, will be described with reference to FIGS. 1 to 3.

Figure 1:
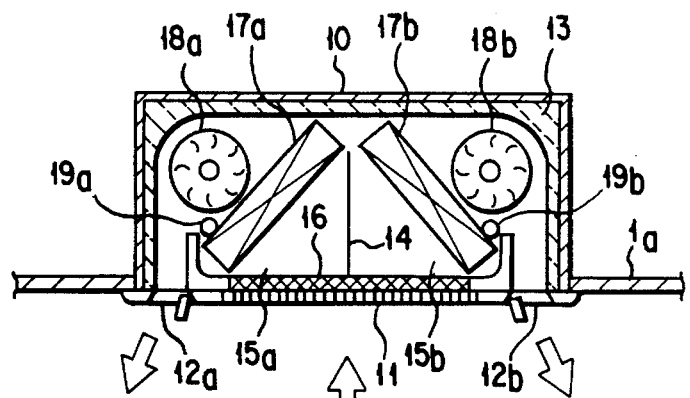
FIG. 1 is a sectional view showing the indoor unit which is incorporated in first, second and third embodiments of the present invention.

This air conditioner comprises a indoor unit 10 of the same type, which is illustrated in FIG. 1. As shown in FIG. 2, the indoor unit 10 is secured to the ceiling 1a of a room 1, with its greater part located above the ceiling 1a and with its lower surface positioned flush with the ceiling 1a. The unit 10 has an air inlet 11 formed in the center portion of its lower surface, and two air outlets 12a and 12b formed in its lower surface and arranged on the sides of the air inlet 11.

As shown in FIG. 1, a heat insulator 13 is laid on the inner surfaces of the indoor unit 10. The interior of the unit 10 is partitioned by a wall 14 into two sections, which serve as air passages 15a and 15b. The air passage 15a communicate with the air inlet 11 and the first air outlet 12a. The air passage 15b communicate with the air inlet 11 and the second air outlet 12b. A filter 16 is provided inside the unit 10, covering the air inlet 11.

As shown in FIG. 1, too, a first indoor heat exchanger 17a and a first indoor fan 18a are arranged in the first air passage 15a. Similarly, a second indoor heat exchanger 17a and a second indoor fan 18a are arranged in the second air passage 15b. A first temperature sensor 19a is connected to the first indoor heat exchanger 17a, and a second temperature sensor 19b is coupled to the second indoor heat exchanger 17b.

When the first indoor fan 18a is driven, indoor air is drawn from the room 1 into the first air passage 15a via the air inlet 11 and the filter 16. The indoor air flows into the first indoor heat exchanger 17a and is conditioned thereby. The air conditioned is supplied from the first indoor heat exchanger 17a into the room 1 through the first air outlet 12a. When the second indoor fan 18b is driven, indoor air is drawn from the room 1 into the second air passage 15b via the air inlet 11 and the filter 16. The indoor air then flows into the second indoor heat exchanger 17b and is conditioned thereby. The air conditioned is supplied from the second indoor heat exchanger 17b into the room 1 through the second air outlet 12b.

Figure 2:
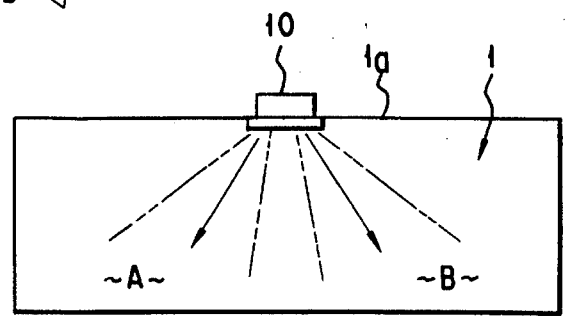
FIG. 2 is a diagram illustrating the positional relationship between the indoor unit and the space of a room.

As shown in FIG. 2, the air blown by the first indoor fan 18a into the room 1 via the first air outlet 12a is supplied in a first direction toward a zone A of the room 1. In contrast, the air blown by the second indoor fan 18b into the room 1 via the second air outlet 12b is supplied in a second direction toward a zone B of the room 1.

The air conditioner further comprises a refrigerating cycle unit and a control section 30, which will be described with reference to FIG. 3.

Figure 3:
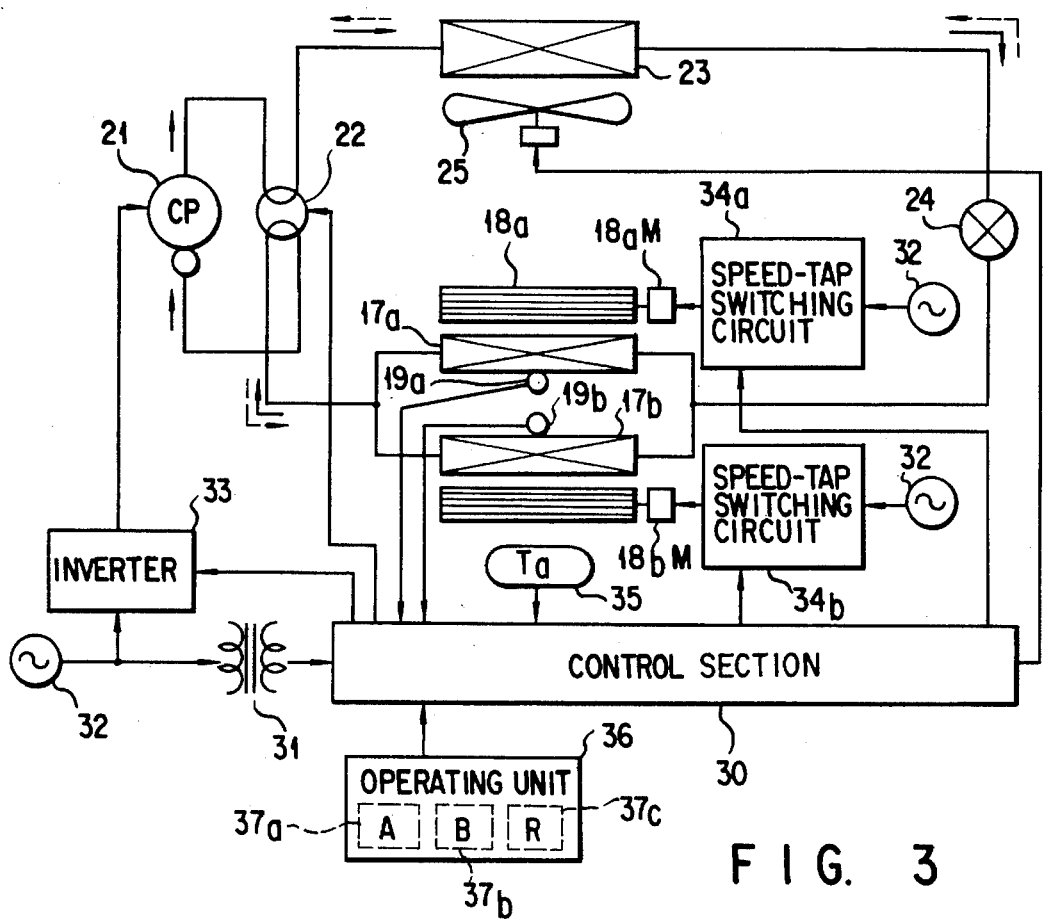
FIG. 3 is a block diagram showing the refrigerating cycle unit and the control section, both incorporated in the embodiments of the invention.

As shown in FIG. 3, the refrigerating cycle comprises a compressor 21, a four-way valve 22, an outdoor heat exchanger 23, and an expansion valve 24. The compressor 21 has an inlet port and a discharge port; it is designed to draw a refrigerant through the inlet, compresses the refrigerant, and to discharge the compressed refrigerant through the discharge port. The discharge port of the compressor 21 is connected to the four-way valve 22, which in turn is coupled to the outdoor heat exchanger 23.

The outdoor heat exchanger 23 is connected to the expansion valve 24, which is connected to both indoor heat exchangers 17a and 17b. The indoor heat exchangers 17a and 17b are coupled in parallel to each other by pipes. An outdoor fan 25 is located near the outdoor heat exchanger 23, for supplying outdoor air into the outdoor heat exchanger 23.

In cooling mode, the refrigerant discharged from the compressor 21 flows in the direction indicated by solid-line arrows, thus forming a cooling cycle, and the outdoor heat exchanger 23 works as a condenser, whereas the indoor heat exchangers 17a and 17b function as evaporators. In heating mode, the refrigerant discharge from the compressor 21 flows in the direction indicated by broken-line arrows, thus forming a heating cycle, and the outdoor heat exchanger 23 works as an evaporator, whereas the indoor heat exchangers 17a and 17b function as condensers.

The control section 30 comprises a microcomputer and peripheral circuits therefor. The section 30 is connected by a transformer 31 to a commercial available power supply 32. Connected to the control section 30 are: the first temperature sensor 19a, the second temperature sensor 19b, the four-way valve 22, the outdoor fan 25, an inverter 33, speed-tap switching circuits 34a an 34b, an indoor temperature sensor 35, and an operating unit 36 (i.e., a remote controller).

The inverter 33 rectifies the voltage applied from the power supply 32 into a voltage of a predetermined frequency (and level) determined in accordance with a control signal supplied from the section 30. The output voltage of the inverter 33 is applied, as drive power, to the motor (not shown) of the compressor 21.

The speed-tap switching circuit 34a is connected to a first indoor fan the motor 18aM for rotating the first indoor fan 18a. Similarly, the speed-tap switching circuit 34b is connected to a second indoor fan motor 18bM for rotating the second indoor fan 18b. The motors 18aM and 18bM have eight taps each, i.e., ultra-high speed tap UH, high speed tap H, three intermediate speed taps M+, M and M−, and three Low speed taps L+, L and L−. The circuit 34a supplies electric power to one of the taps of the motor 18aM in accordance with a control signal output from the control section 30. The circuit 34b supplies electric power to one of the taps of the motor 18bM in accordance with a control signal output from the control section 30. Hence, both indoor fan motors 18aM and 18bM can be driven at eight different speeds. The indoor fans 18a and 18b can thereby supply air into the room 1 at eight different rates.

The operating unit 36 has a key pad (not shown) and three buttons 37a, 37b and 37c. The keys of the key pad may be operated to select the cooling mode or the heating mode, to set a desired indoor temperature, and to select one of three rates (i.e., high, intermediate, low) at which the fans 18a and 18b are to supply air into the room 1. The first button 37a may be pushed to set the air conditioner into first local control mode, to thereby perform air conditioning in the zone A of the room 1. The second button 37b may be operated to set the air conditioner into second local control mode, to thereby perform air conditioning in the zone B of the room 1. The third button 37c may be depressed to reset the air conditioner, thereby releasing it from the local control mode and setting it back into the ordinary control mode.

The control section 30 has the following means:

[1] Means for supplying the refrigerant from the compressor 21 back into the compressor 21 through the four-way valve 22, the outdoor heat exchanger 23, the expansion valve 24, the indoor heat exchangers 17a and 17b, and the four-way valve 22, to thereby cooling the room.

[2] Means for supplying the refrigerant from the compressor 21 back into the compressor 21 through the four-way valve 22, the indoor heat exchangers 17a and 17b, the expansion valve 24, the outdoor heat exchanger 23, and the four-way valve 22, to thereby heating the room.

[3] Means for controlling the output frequency of the inverter 33 (i.e., the drive frequency of the compressor 21) in accordance with the indoor temperature $T_a$ detected by the indoor temperature sensor 35 and the temperature $T_s$ preset by operating the operating unit 36.

[4] Means for setting the rates of supplying air into the room by the indoor fans 18a and 18b, at the value preset by operating the operating unit 36, if neither the first button 37a nor the second button 37b has been pushed.

[5] Means for setting the air conditioner into local control mode when the first button 37a or the second button 37b has been pushed, to thereby change the ratio between the rate of supplying air by the first indoor fan 18a and the rate of supplying air by the second indoor fan 18b.

[6] Means for selecting the higher or lower of the temperatures $T_1$ and $T_2$ detected by the temperature sensors 19a and 19b, respectively, in accordance with which mode the air conditioner has been set, the cooling mode or the heating mode.

[7] Means for controlling the rates of supplying air by the indoor fans 18a and 18b, in accordance with the temperature $T_1$ or $T_2$ which has been selected.

Figure 4:
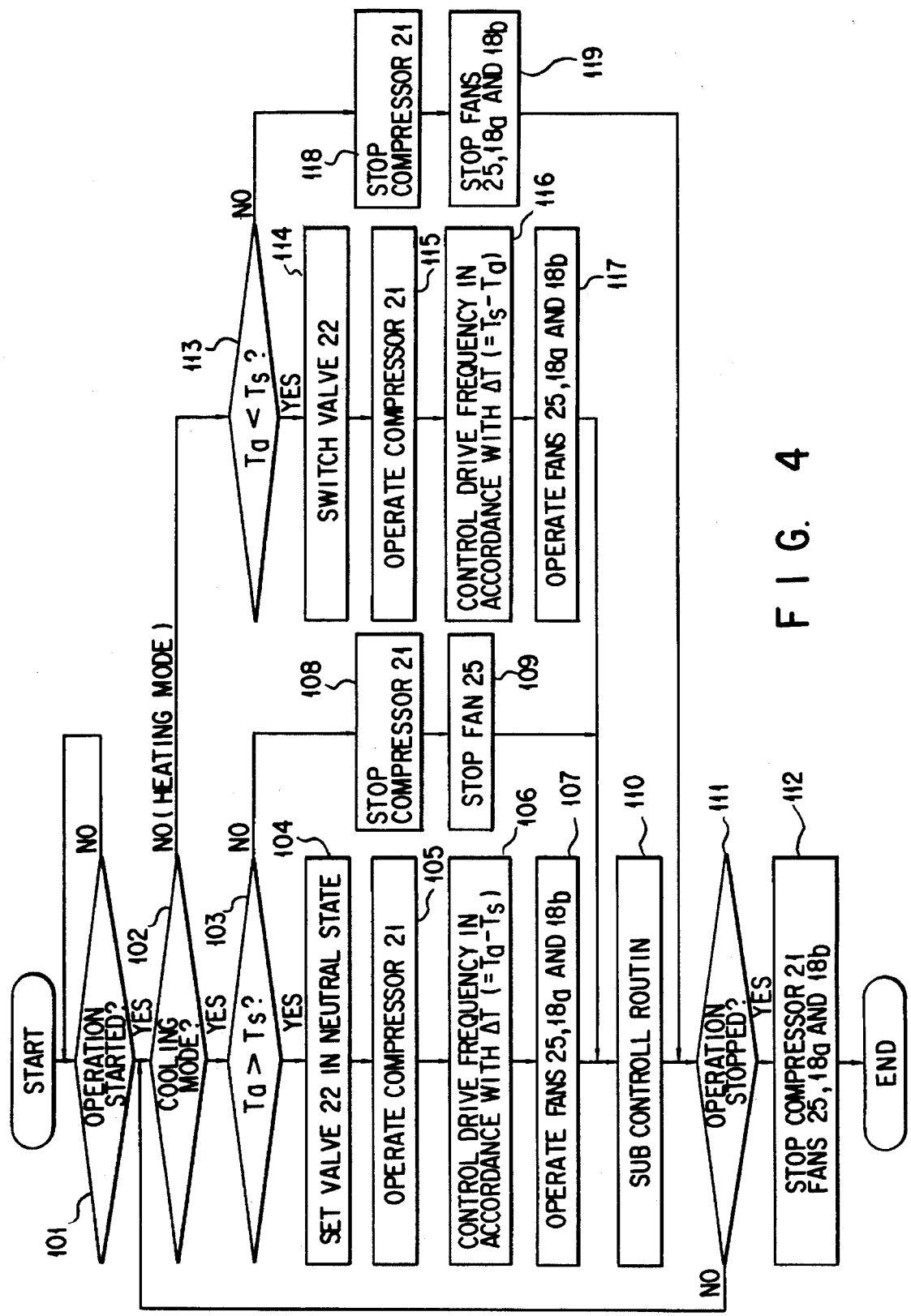
FIG. 4 is a flow chart for explaining the operation of the embodiments of the invention.

The air conditioner, described above, will be explained with reference to the flow chart of FIG. 4.

First, in Step 101, it is determined whether or not the air conditioner has been started to operate. If NO, Step 101 is repeated. If YES, the flow goes to Step 102, in which it is determined whether or not the air conditioner has been set in the cooling mode and a temperature $T_s$ has been preset, by operating the operating unit 36. If YES, then in Step 103, it is determined whether or not the present indoor temperature $T_a$ detected by the indoor temperature sensor 35 is higher than the temperature $T_s$ preset by operating the operating unit 36. If YES in Step 103, the flow goes to Step 104, in which the four-way valve 22 is set in neutral position. Then, in Step 105 the compressor 21 is started to operate, and in Step 106 the control section 30 controls the drive frequency of the compressor 21 (i.e., the output frequency of the inverter 33) in accordance with the difference ΔT between the temperatures $T_a$ and $T_s$ (ΔT=$T_a$−$T_s$). Next, in Step 107, the outdoor fan 25 and both indoor fans 18a and 18b are started to operate.

As a result, the compressor 21 discharges the refrigerant, which is supplied through the four-way valve 22 into the outdoor heat exchanger 23 and then into the expansion valve 24—as indicated by the solid-line arrows in FIG. 3. The refrigerant is decompressed in the expansion valve 24 and flows into the indoor heat exchangers 17a and 17b. The refrigerant in these heat exchangers 17a and 17b takes heat from the indoor air and turns into vapor. The refrigerant vapor flows from both indoor heat exchangers 17a and 17b and is then drawn into the compressor 21.

Hence, the outdoor heat exchanger 3 functions as a condenser, whereas the indoor heat exchangers 17a and 17b work as evaporators. Thus, the air conditioner cools the room 1.

If NO in Step 103, that is, if the indoor temperature $T_a$ is equal to or lower than the preset temperature T, the flow goes to Step 108 and hence to Step 109. The compressor is stopped in Step 108, and the outdoor fan 25 is stopped in Step 109. As a result, the air conditioner stops cooling the room 1. Both indoor fans 18a and 18b continue to rotating, supplying air into the room 1.

Thereafter, when the indoor temperature $T_a$ rises above the present temperature $T_s$ (namely, when YES in Step 103), Steps 104 to 107 are performed in sequence. In other words, the air conditioner cools the room 1 again.

The flow goes from Step 107 to Step 110. In Step 110, a sub-control routine is executed in Step 110 to control the indoor fans 18a and 18b so as to adjust the rates of supplying air into the room 1 through air outlets 12a and 12b (FIG. 1). The sub-control routine will be described later in detail.

Next, in Step 111 it is determined whether or not the operating unit 36 has been operated to stop the cooling operation. If YES, then in Step 112, the compressor 21, the outdoor fan 25 and the indoor fans 18a and 18b are stopped. The air conditioner thereby stops cooling the room 1.

If NO in Step 102, that is, if the operating unit 36 has been operated to set the air conditioner into the heating mode, the flow goes to Step 113. In Step 113, it is determined whether or not the indoor temperature $T_a$ detected by the indoor temperature sensor 35 is lower than the present temperature $T_s$. If YES, the flow goes to Step 114, in which the four-way valve 22 is switched. Then, the compressor 21 is operated in Step 115, and the drive frequency of the compressor 21 (i.e., the output frequency of the inverter 33) is controlled in accordance with the difference ΔT between the temperatures $T_s$ and $T_a$ (ΔT=$T_s$−$T_a$). Nest, in Step 117, the outdoor fan 25 and both indoor fans 18a and 18b are started to rotate.

As a result, the compressor 21 discharges the refrigerant, which is supplied through the four-way valve 22 into the indoor heat exchangers 17a and 17b—as indicated by the broken-line arrows in FIG. 3. In these heat exchangers 17a and 17b, the refrigerant radiates heat and hence liquefies. The refrigerant liquid flows from both indoor heat exchangers 17a and 17b into the outdoor heat exchanger 23 through the expansion valve 24. The refrigerant is decompressed as it passes through the expansion valve 24. In the out door heat exchanger 23, the refrigerant takes heat from the outdoor air and turns into vapor. The refrigerant vapor flows from the outdoor heat exchanger 23 and is subsequently drawn into the compressor 21.

Hence, the outdoor heat exchanger 3 functions as an evaporator, whereas the indoor heat exchangers 17a and 17b work as condensers. Thus, the air conditioner heats the room 1.

If NO in Step 113, that is, if the indoor temperature $T_a$ is equal to or higher than the preset temperature $T_s$, the flow goes to Step 118 and hence to Step 119. The compressor 21 is stopped in Step 118, and the outdoor fan 25 and the indoor fans 18a and 18b are stopped in Step 119. The air conditioner thereby stops heating the room 1.

Thereafter, when the indoor temperature $T_a$ falls below the present temperature $T_s$ (namely, when YES in Step 113), Steps 114 to 117 are performed in sequence. In other words, the air conditioner heats the room 1 again.

If YES in Step 111, namely, the operating unit 36 has been operated to stop the heating operation, the compressor 21, the outdoor fan 25 and the indoor fans 18a and 18b are stopped in Step 112. The air conditioner thereby stops heating the room 1.

Figure 5A:
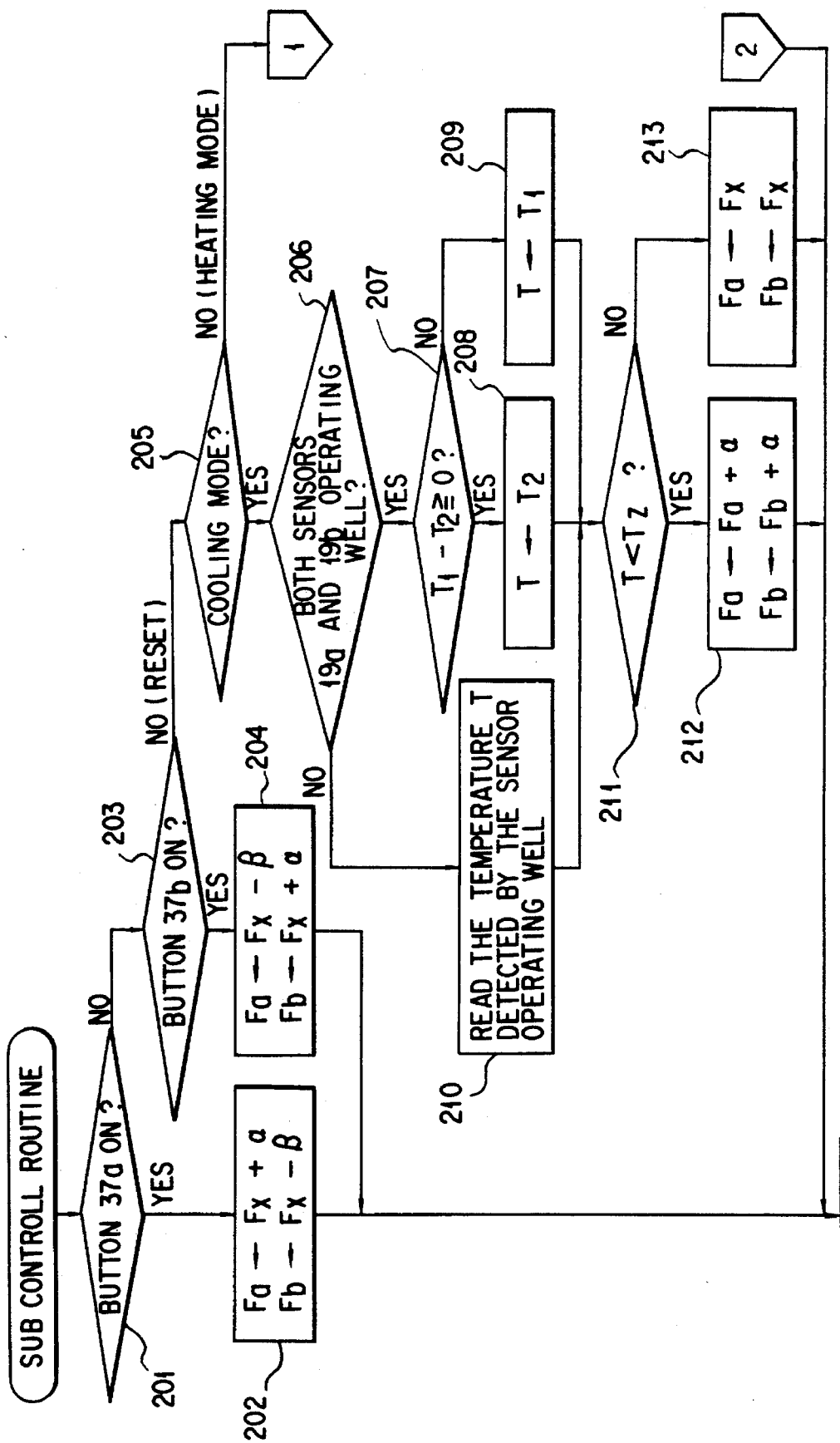
FIGS. 5A and 5B constitute a flow chart illustrating a sub-control routine performed in the first embodiment of the invention.

The sub-control routine performed in Step 110 (FIG. 4) will now be explained in detail, with reference to the flow chart of FIGS. 5A and 5B and the diagrams of FIGS. 6 and 7.

When neither the button 37a nor the button 37b of the operating unit 36 is depressed, ordinary control mode is selected, whereby both air-supplying rates $F_a$ and $F_b$ for the indoor fans 18a and 18b, respectively, are set at a prescribed value $F_x$ preset by operating the operating unit 36.

More specifically, if the operation unit 36 is operated to select a high supply rate, which is one of the three alternative choices shown in FIG. 6, the speed-tap switching circuits 34a and 34b supply a current to the taps H of the indoor fan motors 18aM and 18bM. Both indoor fans 18a and 18b are thereby rotated at high speed, supplying conditioned air at the high rate into the zones A and B of the room 1, respectively. Alternatively, if the operating unit 36 is operated to select an intermediate supply rate (FIG. 6), the speed-tap switching circuits 34a and 34b supply a current to the taps M of the indoor fan motors 18aM and 18bM. The indoor fans 18a and 18b are thereby rotated at intermediate speed, supplying conditioned air at the intermediate rate into the zones A and B of the room 1, respectively. Still alternatively, if the operating unit 36 is operated to select a low supply rate (FIG. 6), the speed-tap switching circuits 34a and 34b supply a current to the taps L of the indoor fan motors 18aM and 18bM. The indoor fans 18a and 18b are thereby rotated at low speed, supplying conditioned air at the low rate into the zones A and B of the room 1, respectively.

In the ordinary control mode, the fans 18a and 18b supply conditioned air in the amounts and directions as indicated by the solid-line arrows in FIG. 2, which represent vectorial quantities.

When either the button 37a or the button 37b of the operating unit 36 is pushed, local control mode is selected, whereby air-supplying rates $F_a$ and $F_b$ for the indoor fans 18a and 18b are set at different values. In other words, the ratio between the rates $F_a$ and $F_b$ is changed.

To be more specific., it is determined in Step 201 whether the first button 37a has been pushed or not. If YES, the flow goes to Step 202. In Step 202, the local control mode is selected for the zone A of the room 1. The air-supplying rate $F_a$ for the first indoor fan 18a is increased by α from the prescribed value $F_x$, whereas the air-supplying rate $F_b$ for the second indoor fan 18b is decreased by a from the prescribed value $F_x$.

Assume the high supply rate is selected when the control mode is switched from the ordinary control mode to the local control mode for the zone A. Then, the speed-tap switching circuit 34a supplies the current to the ultra-high speed tap UH of the first indoor fan motor 18aM, raising the speed of the first indoor fan 18a from the high speed to the ultra-high speed. Meanwhile, the speed-tap switching circuit 34a supplies the current to the first intermediate speed tap M+ of the second indoor fan motor 18bM, lowering the speed of the second indoor fan 18b from the high speed to the first intermediate speed.

Assume the intermediate supply rate is selected when the control mode is switched from the ordinary control mode to the local control mode for the zone A. Then, the speed-tap switching circuit 34a supplies the current to the first intermediate tap M+ of the first indoor fan motor 18aM, raising the speed of the first indoor fan 18a from the intermediate speed to the firs intermediate speed. Meanwhile, the speed-tap switching circuit 34a supplies the current to the third intermediate speed tap M– of the second indoor fan motor 18bM, lowering the speed of the second indoor fan 18b from the intermediate speed to the third intermediate speed.

Assume the low supply rate is selected when the control mode is switched from the ordinary control mode to the local control mode for the zone A. Then, the speed-tap switching circuit 34a supplies the current to the third intermediate speed tap M– of the first indoor fan motor 18aM, raising the speed of the first indoor fan 18a from the low speed to the third intermediate speed. Meanwhile, the speed-tap switching circuit 34a supplies the current to the third low speed tap L– of the second indoor fan motor 18bM, lowering the speed of the second indoor fan 18b from the low speed to the third low speed.

In the local control mode for the zone A, the fans 18a and 18b supply conditioned air in the amounts and directions as indicated by the solid-line arrows in FIG. 8, which represent vectorial quantities.

If NO in Step 201, namely, if the first button 37a has not been pushed, the flow goes to Step 203. In Step 203, it is determined whether the second button 37a has been depressed or not. If YES, the local control mode is selected for the zone B of the room 1 is selected in Step 204. The air-supplying rate $F_a$ for the first indoor fan 18a is decreased by a from the prescribed value $F_x$, whereas the air-supplying rate $F_b$ for the second indoor fan 18b is increased by α from the prescribed value $F_x$.

Thus, the local control modes for the zones A and B can be selected by operating the first buttons 37a and 37b, respectively, thereby changing the ratio between the rates $F_a$ and $F_b$ to various values. This makes it possible to accomplish efficient air conditioning in either the zone A or the zone B. It is desirable that the air conditioner be set in the local control mode in the case the apparatus is installed for a spacious living room and a few occupants sit in a corner of that room. Since the corner of the room is concentratedly air-conditioned, the occupants can attain conform within a short time after the air conditioner has been set into the local control mode. In other words, the air conditioner can operate in its full capacity and can, therefore, be efficient from an economical point of view.

It is most desirable that the indoor unit 10 be located at the center of the ceiling. The unit 10 must be attached to a corner of the ceiling, however, due to the arrangement of furniture. Even in this case, the air conditioner can efficiently air-condition any zone of the room where the occupants are sitting.

Furthermore, in the local control mode, the conditioned air is supplied at a low rate to a first zone and at a high rate to the second zone. Therefore, the second zone is sufficiently air-conditioned, without necessity of increasing the capacity of the compressor 21. This helps to save energy.

The air conditioner can be released from the local control mode, back to the ordinary control mode, merely by pushing the third button 37c.

In the ordinary control mode, the temperature sensors 19a and 19b keep detecting the temperatures $T_1$ and $T_2$ of the indoor heat exchangers 17a and 17b, respectively, and the rates $F_a$ and $F_b$ at which to supply the conditioned air into the room 1 by the indoor fans 18a and 18b are controlled in accordance with the temperatures $T_1$ and $T_2$. How the air-supplying rates are controlled in the ordinary control mode will now be explained, with reference to the flow chart of FIGS. 5A and 5B.

First, it is determined in Step 205 whether the air conditioner has been set in the cooling mode or not. If YES, the flow goes to Step 206, in which it is determined whether the temperature sensors 19a and 19b are working well. If YES in Step 206, the flow goes to Step 207, in which it is determined whether the temperature $T_1$ detected by the sensor 18a is equal to or higher than the temperature $T_2$ detected by the sensor 19b. If YES in Step 207, then in Step 208 the temperature $T_2$ is selected and stored as a temperature T of evaporator into the microcomputer incorporated in the control section 30. If NO in Step 207, in Step 209 the temperature $T_1$ is selected and stored as the temperature T of evaporator into the microcomputer.

While the air conditioner is operating in the cooling mode, drain adheres to the outer surfaces of the indoor heat exchangers 17a and 17b which are working as evaporators. The temperature of the heat exchanger 17a or 17b which receives less air than the other decreases. When the temperature falls below the freezing point, the drain on this heat exchanger freezes, inevitably reducing the amount of heat exchanged in the heat exchanger. Consequently, the cooling efficiency will decrease. To prevent freezing of the drain, the temperature $T_1$ or $T_2$ which is lower than the other is stored as the temperature T of evaporator into the microcomputer incorporated in the control section 30.

If NO in Step 206, that is to say, if either the sensor 19a or 19b is not operating well, the flow goes to Step 210. In Step 210, the temperature detected by the sensor operating well is selected and stored as the temperature T of evaporator into the microcomputer incorporated in the control section 30.

Thereafter, in Step 211, it is determined whether or not the temperature T stored in the microcomputer is lower than a prescribed temperature Tz at or above which both indoor heat ex changers 17a an 17b must be maintained in order not to prevent drain freezing. If YES in Step 211, the flow goes to Step 212, in which the speed of the indoor fan motors 18aM and 18bM are raised one step up, thereby increasing the air-supplying rates $F_a$ and $F_b$ of the indoor fans 18a and 18b by value α. As a result, the temperature fall of the indoor heat exchangers 17a and 17b are suppressed, and the drain on the heat exchangers 17a and 17b are prevented from freezing.

Figure 5B:
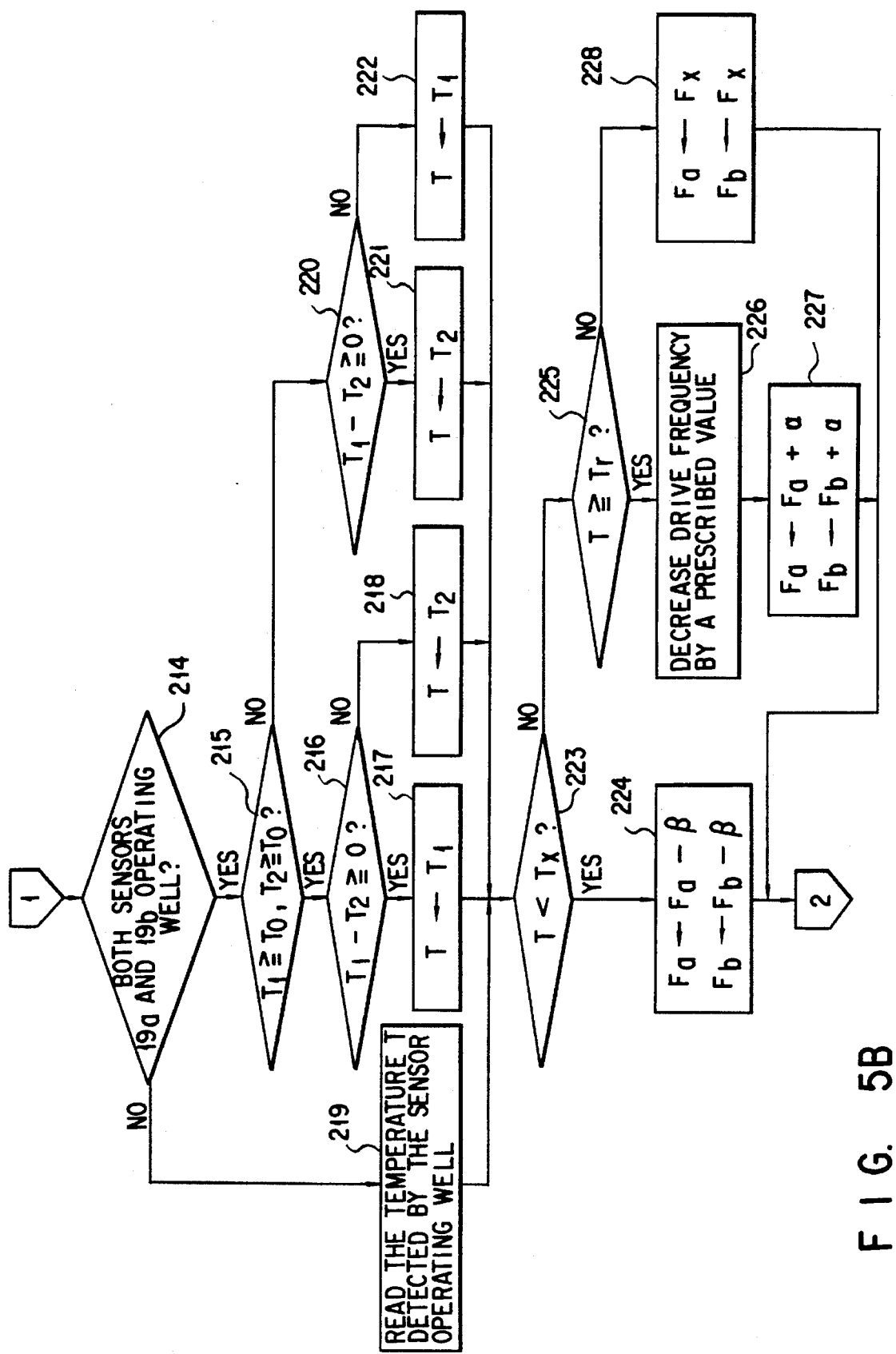

If NO in Step 205, namely, if the air conditioner has been set in the heating mode, the flow goes to Step 214 (see FIG. 5B). In Step 214, it is determined whether or not both the temperature sensors 19a and 19b is not working well. If YES, it is determined in Step 215 whether the temperatures $T_1$ and $T_2$ detected by the sensors 19a and 19b have reached a preset value $T_0$ or not. If NO in Step 215, it is determined in Step 220 whether or not the temperature $T_1$ is equal to or higher than the temperature $T_2$. If YES in Step 220, the flow goes to Step 221, in which the temperature $T_2$ is selected and stored as a temperature T of condenser into the microcomputer which is incorporated in the control section 30. If NO in Step 220, that is, if the temperature $T_1$ is lower than the temperature $T_2$, then flow goes to Step 222, in which the temperature $T_1$ is selected and stored as the temperature T of condenser into the microcomputer.

Next, in Step 223 it is determined whether the temperature T stored in the microcomputer is lower than a preset value $T_x$. If YES, the speed of the indoor fan motors 18aM and 18bM are lowered one step down in Step 224, thus decreasing the air-supplying rates $F_a$ and $F_b$ of the indoor fans 18a and 18b by value β.

Thus, at the start of the heating operation, the lower of the temperatures $T_1$ and $T_2$ is stored into the microcomputer as the temperature T of condenser, and the air-supplying rates $F_a$ and $F_b$ of the indoor fans 18a and 18b are decreased what the temperature T is lower than the value Tx, thereby preventing cold air from flowing into the room 1. As a result, no occupants of the room 1 feel uncomfortable.

During the heating operation, the temperature of the heat exchanger 17a or 17b which receives less air than the other may increase, causing the high-pressure side pressure to rise extremely. The extreme rise of the pressure shortens the lifetime of the components of the refrigerating cycle unit. To prevent such an extreme pressure rise, the following measures are taken in the air conditioner of this invention.

If YES in Step 215, that is to say, if the temperatures $T_1$ and $T_2$ have reached a preset value $T_0$, the flow goes to Step 216. In Step 216, it is determined whether or not the temperature $T_1$ is equal to or higher than the temperature $T_2$. If YES, then in Step 217, the temperature $T_1$ is selected and stored as the temperature T of condenser into the microcomputer. If NO, namely, if the temperature $T_1$ is lower than the temperature $T_2$, then in Step 218, the temperature $T_2$ is selected and stored as the temperature T of condenser into the microcomputer incorporated in the control section 30.

If NO in Step 214, that is, if one of the temperature sensors 19a and 19b is not working well, the flow goes to step 219. In Step 219, the temperature detected by the sensor not operating well is selected and stored as the temperature T of evaporator into the microcomputer. Then, it is determined in Step 225 whether or not the temperature T is equal to or higher than a preset value Tr. If YES, the flow goes to Step 226, in which the drive frequency of the compressor 21 (i.e., the output frequency of the inverter 33) is decreased by a prescribed value. In other words, the capacity of the compressor 21 is reduced. At the same time, in Step 227, the speed of the indoor fan motors 18aM and 18bM are raised one step up, increasing the air-supplying rates $F_a$ and $F_b$ of the indoor fans 18a and 18b by value α.

As the rates $F_a$ and $F_b$ so increase, the temperature T of condenser lowers. Owning to the fall of the temperature T and the reduction in the capacity of the compressor 21, the high-pressure side pressure is reliably prevented from rising extremely.

An air conditioner according to a second embodiment of the present invention will now be described. This air conditioner is identical to the first embodiment, except for the following two points. First, as shown in FIG. 9, the indoor unit 10 has two radiation temperature sensors 38a and 38b on its lower surface, and the local control mode is selected for either the zone A or the zone B in accordance with the temperatures these sensors 38a and 38b have detected, not by operating the operating unit 36 as in the first embodiment. Second, when one of temperature sensors 19a and 19b is not operating well, the air-supplying rates $F_a$ and $F_b$ of the indoor fans 18a and 18b are fixed, not controlled by the temperature detected by the sensor operating well.

Figure 10A:
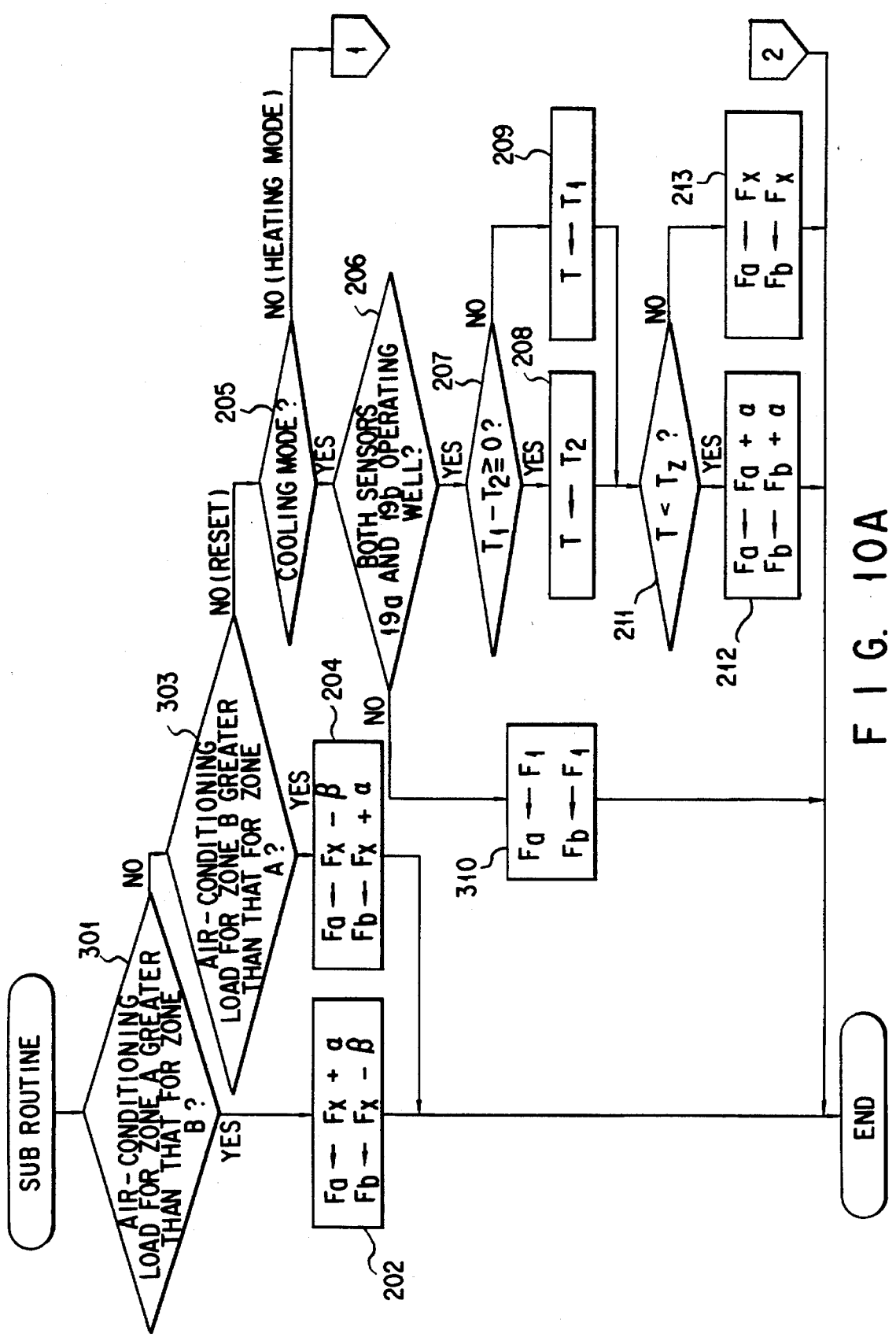
FIGS. 10A and 10B are a flow chart illustrating a sub-control routine performed in the second embodiment of the invention.
Figure 10B:
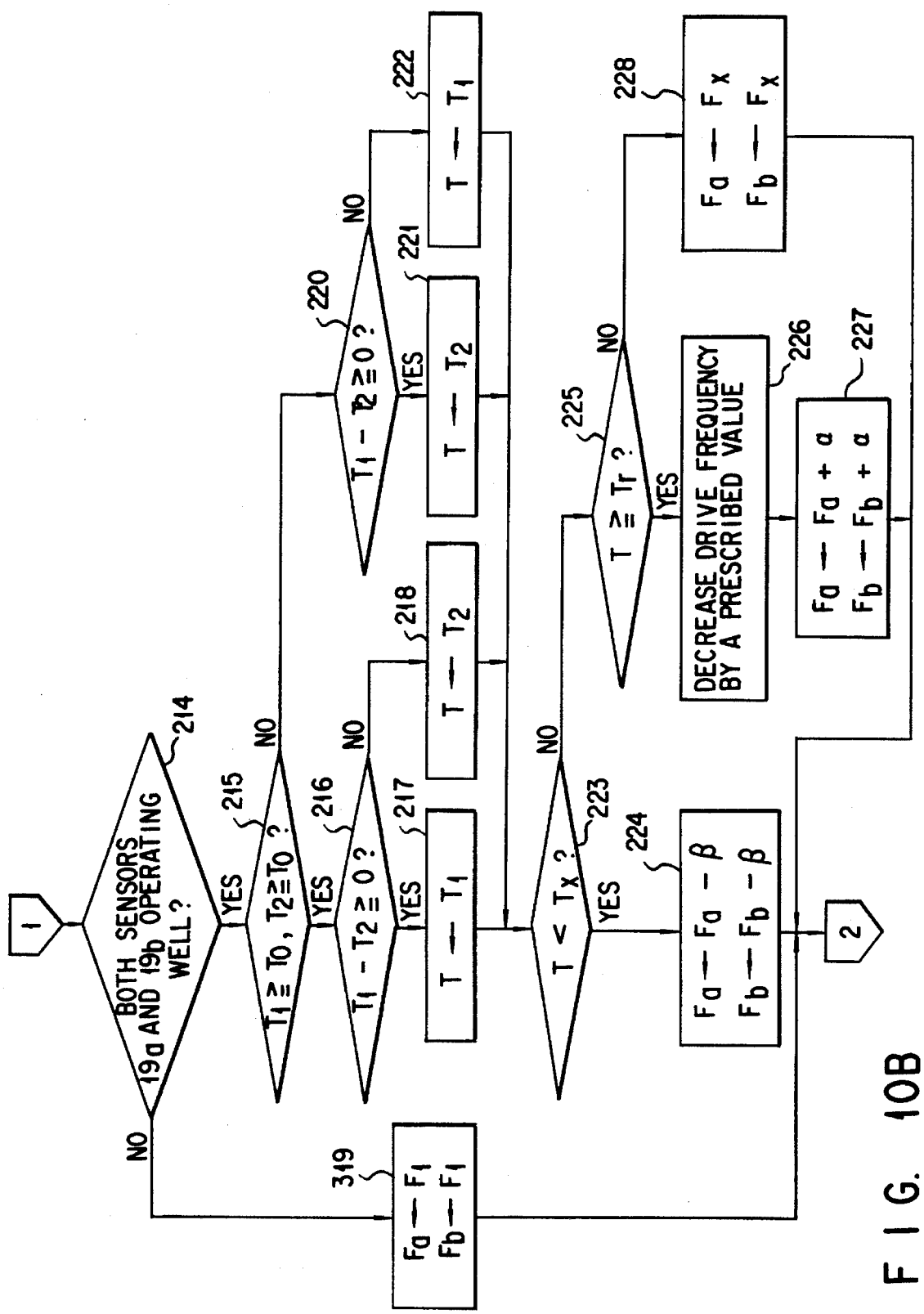

The operation of the second embodiment will be explained, with reference to the flow chart of FIGS. 10A and 10B. As may be understood from FIGS. 10A and 10B, the operation is characterized by Steps 301, 303, 310 and 319 which are performed in place of Steps 201, 203, 210 and 219.

The radiation temperature sensor 38a detects the heat radiated from the walls and floor in the zone A. The air-conditioning load for the zone A is determined from the radiation temperature detected by the sensor 38a. Meanwhile, the radiation temperature sensor 38b detects the heat radiated from the walls and floor in the zone B. The air-conditioning load of for zone B is determined from the radiation temperature detected by the sensor 38b.

In Step 301 it is determined whether or not the air-conditioning load for the zone A is greater than that for the zone B. If YES, the local control mode for the zone A is automatically selected. More specifically, in the cooling mode, the local control mode for the zone A is selected when the radiation temperature detected by the sensor 38a is higher than the radiation temperature detected by the sensor 38b. Conversely, in the heating mode, the local control mode for the zone A is selected when the radiation temperature detected by the sensor 38a is lower than the radiation temperature detected by the sensor 38b.

If YES in Step 303, namely, if the air-conditioning load for the zone B is greater than that for the zone A, the flow goes to Step 204. In Step 204, the local control mode is automatically selected for the zone B of the room 1. To be more specific, in the cooling mode, the local control mode for the zone B is selected when the radiation temperature detected by the sensor 38b is higher than the radiation temperature detected by the sensor 38a. Conversely, in the heating mode, the local control mode for the zone B is selected when the radiation temperature detected by the sensor 38b is lower than the radiation temperature detected by the sensor 38a.

If NO in Step 206 or Step 214, that is to say, if the temperature sensor 19a or 19b is not functioning well, the flow goes to Step 310 or Step 319. In Step 310 or Step 319, the air-supplying rates $F_a$ and $F_b$ of the indoor fans 18a and 18b are held at a predetermined air-supplying rate $F_1$. The rate $F_1$ may take one value during the cooling operation and another during the heating operation.

An air conditioner according to a third embodiment of the invention will now be described with reference to FIG. 11. This air conditioner is identical to the second embodiment, except that two infrared-ray sensors 39a and 39b are used, instead of the radiation temperature sensors 38a and 38b.

Figure 12A:
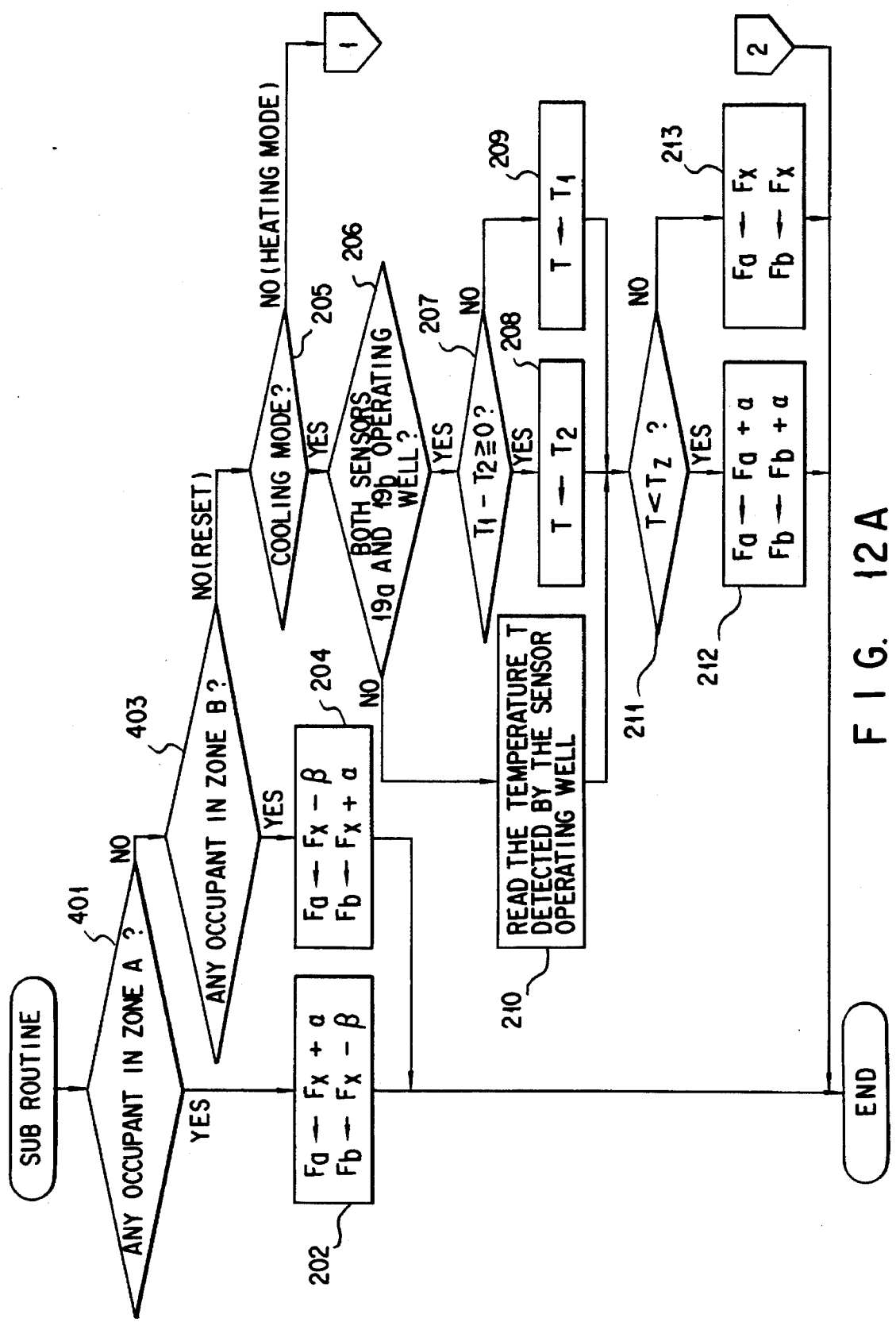
FIGS. 12A and 12B constitute a flow chart illustrating a sub-control routine performed in the third embodiment of the invention.
Figure 12B:
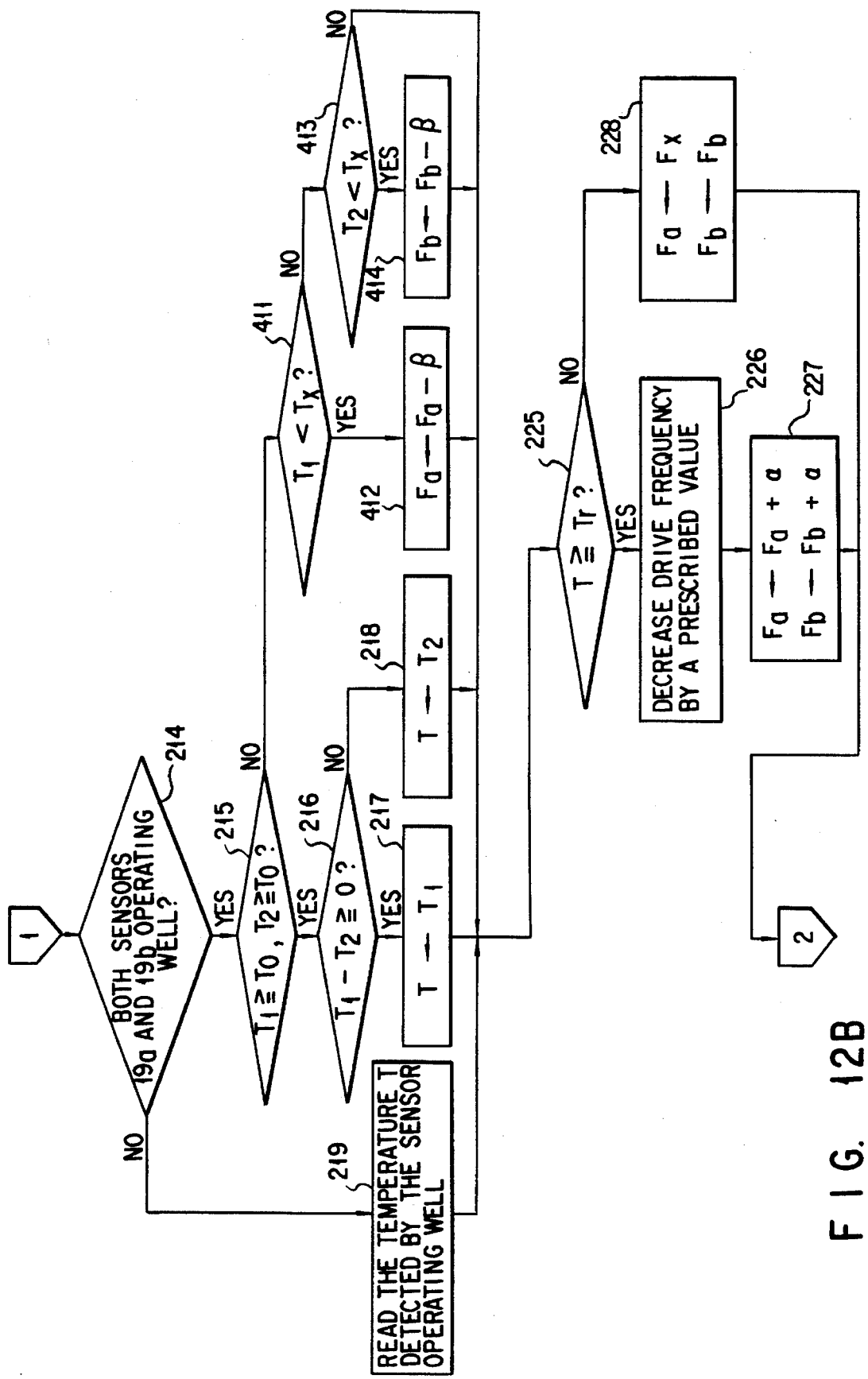

The operation of the third embodiment will be explained, with reference to the flow chart of FIGS. 12A and 12B. As may be understood from FIGS. 12A and 12B, the operation is characterized by Steps 401, 403 which are performed in place of Steps 201 and 203, and by Steps 411 to 414 which are performed in place of Steps 220 to 224.

The infrared-ray sensor 39a detects the infrared rays radiated any occupant in the zone A of the room 1. Meanwhile, the infrared-ray sensor 39b detects infrared rays radiated from any occupant in the zone B of the room 1.

In Step 401, it is determined, from the output of the infrared-ray sensor 39a, whether or not any occupant is in the zone A. If YES, the local control mode for the zone A is automatically selected in Step 202. If NO, it is determined in Step 403, from the output of the infrared-ray sensor 39b, whether or not occupant is in the zone B. If YES in Step 403, the local control mode for the zone B is automatically selected in Step 204.

If NO in Step 215, namely, if the temperatures $T_1$ and $T_2$ detected by the sensors 19a and 19b have not reached a preset value $T_0$ as at the start of heating operation, they are compared with a preset value $T_x$ in Step 411 and Step 413, respectively. In accordance with the results of comparison, the air-supplying rates $F_a$ and $F_b$ of the indoor fans 18a and 18b are controlled independently of each other.

More precisely, if YES in Step 411, that is, if the temperature $T_1$ is lower than the value $T_x$, the speed of the indoor fan motor 18aM is decreased one step down, whereby the air-supplying rate $F_a$ is reduced by a predetermined value β in Step 412. Also, if YES in Step 413, that is, if the temperature $T_2$ is lower than the value $T_x$, the speed of the indoor fan motor 18bM is decreased one step down, whereby the air-supplying rate $F_b$ is reduced by a predetermined value β in Step 414.

In the embodiments described above, an electric current is supplied to the selected one of the speed taps of the indoor fan motor 18aM, and to the selected one of the speed taps of the indoor fan motor 18bM, thereby changing the air-supplying rates $F_a$ and $F_b$ of the indoor fans 18a and 18b. Instead, two inverters may be used for driving the motors 18aM and 18bM, respectively, and the output frequencies of these in verters may be controlled to continuously change the air-supplying rates $F_a$ and $F_b$ of the fans 18a and 18b, continuously, not stepwise as in the embodiments described above. Moreover, the indoor unit 10 may be attached to any wall of the room 1, not on the ceiling 1a as in the embodiments described above.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An air conditioning apparatus capable of operating in cooling mode and heating mode, comprising:
   a first indoor heat exchanger for cooling and heating indoor air;
   a second indoor heat exchanger for cooling and heating the indoor air;
   a first indoor fan for drawing the indoor air and and supplying the indoor air via said first heat exchanger back into the room in a first direction;
   a second indoor fan for drawing the indoor air and supplying the indoor air via said second heat exchanger back into the room in a second direction;
   a first temperature sensor for detecting the temperature of said first heat exchanger;
   a second temperature sensor for detecting the temperature of said second heat exchanger;
   selection means for selecting the higher or lower of the temperatures detected by said first and second temperature sensors, in accordance with the mode in which the apparatus is operating; and
   control means for controlling said first and second indoor fans in accordance with the temperature selected by said selection means.

2. An apparatus according to claim 1, wherein, in the heating mode, said selection means selects the higher of the temperatures detected by said first and second temperature sensors.

3. An apparatus according to claim 1, wherein, in the heating mode, said selection means selects the lower of the temperatures detected by said first and second temperature sensors, before both temperatures reach a preset value, and selects the higher of the temperatures after both temperatures have reached the preset value.

4. An apparatus according to claim 1, wherein, in the cooling mode, said selection means selects the lower of the temperatures detected by said first and second temperature sensors.

5. An apparatus according to claim 1, further comprising a second control means for changing a ratio between air-supplying rates of said first and second indoor fans.

6. An apparatus according to claim 1, further comprising a second selection means for selecting one of said first and second directions, and a second control means for increasing the air-supplying rate of one of said indoor fans which supplies air in the direction selected by the second selection means.

7. An apparatus according to claim 6, wherein said second selection means has a first button for selecting the first direction and a second button for selecting the second direction.

8. An apparatus according to claim 6, wherein said second selection means detects air-conditioning loads in the first and second directions and selects the greater of these air-conditioning loads.

9. An apparatus according to claim 6, wherein said second selection means determines whether an occupant stays in the room and selects the direction in which an occupant stays.

10. An apparatus according to claim 1, further comprising a second selection means for selecting one of said first and second directions, and a second control means for increasing the air-supplying rate of one of said indoor fans which supplies air in the direction selected by the second selection means, and decreasing the air-supplying rate of the other indoor fan.

11. An apparatus according to claim 10, wherein said second selection means has a first button for selecting the first direction and a second button for selecting the second direction.

12. An apparatus according to claim 10, wherein said second selection means detects air-conditioning loads in the first and second directions and selects the greater of these air-conditioning loads.

13. An apparatus according to claim 10, wherein said second selection means determines whether an occupant stays in the room and selects the direction in which an occupant stays.

* * * * *